US012611614B2

(12) United States Patent
Toro Santamaria

(10) Patent No.: US 12,611,614 B2
(45) Date of Patent: *Apr. 28, 2026

---

(54) PROCESS WATER DISTILLATION PLANT AND METHOD FOR OPERATING A PROCESS WATER DISTILLATION PLANT

(71) Applicant: KMU LOFT Cleanwater SE, Kirchentellinsfurt (DE)

(72) Inventor: Jorge Mario Toro Santamaria, Dusslingen (DE)

(73) Assignee: KMU LOFT Cleanwater SE, Kirchentellinsfurt (DE)

( * ) Notice: Subject to any disclaimer, the term of this patent is extended or adjusted under 35 U.S.C. 154(b) by 43 days.

This patent is subject to a terminal disclaimer.

(21) Appl. No.: 18/033,436

(22) PCT Filed: Sep. 29, 2021

(86) PCT No.: PCT/EP2021/076767
§ 371 (c)(1),
(2) Date: Apr. 24, 2023

(87) PCT Pub. No.: WO2022/089868
PCT Pub. Date: May 5, 2022

(65) Prior Publication Data
US 2024/0018016 A1 Jan. 18, 2024

(30) Foreign Application Priority Data

Nov. 2, 2020 (DE) ......................... 102020128823.9

(51) Int. Cl.
*B01D 3/34* (2006.01)
*B01D 1/28* (2006.01)
(Continued)

(52) U.S. Cl.
CPC .......... *B01D 1/2896* (2013.01); *B01D 3/346* (2013.01); *B01D 3/42* (2013.01); *B01D 5/006* (2013.01);
(Continued)

(58) Field of Classification Search
CPC .......... C02F 1/008; C02F 1/041; C02F 1/043; C02F 1/048; B01D 1/2896; B01D 3/346; B01D 3/42; B01D 5/006
See application file for complete search history.

(56) References Cited

U.S. PATENT DOCUMENTS

| | | | | | |
|---|---|---|---|---|---|
| 4,260,461 | A | * | 4/1981 | Pottharst, Jr. ............ | B01D 1/10 202/180 |
| 5,484,510 | A | * | 1/1996 | Hartman ................... | C02F 9/20 422/26 |

(Continued)

FOREIGN PATENT DOCUMENTS

| | | |
|---|---|---|
| CN | 206492231 U | 9/2017 |
| CN | 208975193 U | 6/2019 |

(Continued)

OTHER PUBLICATIONS

Search Report, German Application No. 10 2020 128 823.9; Dated May 12, 2021.

(Continued)

*Primary Examiner* — Jonathan Miller
(74) *Attorney, Agent, or Firm* — Falcon Rappaport & Berkman LLP

(57) ABSTRACT

A process water distillation system comprises an evaporator, a condenser and a compressor configured to generate a desired pressure in at least a region of the system and to convey steam from the evaporator into the condenser during operation of the system. The condenser is in thermal contact with the evaporator so that, at least during certain phases of
(Continued)

operation of the system, thermal energy released during condensation of steam conveyed into the condenser is transferred to a fluid in the evaporator. The system further comprises a concentrate collection area configured to receive concentrate produced during operation of the system and an energy source configured to supply energy to the process water distillation system. A control device is configured to control the supply of energy from the energy source to the system (10) in dependence on the progress of the distillation process in the system.

20 Claims, 1 Drawing Sheet

(51) Int. Cl.

| | |
|---|---|
| *B01D 3/42* | (2006.01) |
| *B01D 5/00* | (2006.01) |
| *C02F 1/00* | (2023.01) |
| *C02F 1/04* | (2023.01) |

(52) U.S. Cl.
CPC .............. *C02F 1/008* (2013.01); *C02F 1/041* (2013.01); *C02F 1/043* (2013.01); *C02F 1/048* (2013.01); *C02F 2209/003* (2013.01); *C02F 2209/02* (2013.01); *C02F 2209/03* (2013.01); *C02F 2209/225* (2013.01); *C02F 2301/066* (2013.01)

(56) References Cited

U.S. PATENT DOCUMENTS

| | | | | |
|---|---|---|---|---|
| 5,587,055 | A * | 12/1996 | Hartman | B01D 3/42 |
| | | | | 202/202 |
| 5,772,850 | A * | 6/1998 | Morris | B01D 1/305 |
| | | | | 159/24.2 |
| 5,906,714 | A * | 5/1999 | Gramkow | B01D 1/2881 |
| | | | | 159/901 |
| 5,968,321 | A * | 10/1999 | Sears | B01D 3/42 |
| | | | | 203/1 |
| 6,365,005 | B1 * | 4/2002 | Schleiffarth | B01D 3/42 |
| | | | | 159/901 |
| 8,771,478 | B2 * | 7/2014 | Ward | B01D 1/2887 |
| | | | | 159/24.2 |
| 8,986,509 | B2 * | 3/2015 | Batty | B01D 5/006 |
| | | | | 73/61.77 |
| 9,005,404 | B2 * | 4/2015 | Batty | B01D 3/02 |
| | | | | 73/61.77 |
| 9,044,693 | B2 * | 6/2015 | Batty | B01D 1/0082 |
| 9,908,789 | B2 * | 3/2018 | Ward | C02F 1/18 |
| 11,649,174 | B2 * | 5/2023 | Schleiffarth | C02F 1/041 |
| | | | | 202/176 |
| 2009/0050467 | A1 * | 2/2009 | Fickenscher | C02F 1/048 |
| | | | | 202/185.1 |
| 2010/0200388 | A1 * | 8/2010 | Ward | B01D 5/006 |
| | | | | 202/180 |
| 2012/0205231 | A1 * | 8/2012 | Batty | B01D 5/006 |
| | | | | 165/185 |
| 2015/0360971 | A1 * | 12/2015 | Schleiffarth | C02F 1/041 |
| 2016/0130156 | A1 * | 5/2016 | Ward | B01D 1/221 |
| | | | | 202/177 |
| 2023/0398467 | A1 * | 12/2023 | Hinz | B01D 1/0082 |
| 2024/0018016 | A1 * | 1/2024 | Toro Santamaria | B01D 1/2896 |

FOREIGN PATENT DOCUMENTS

| | | |
|---|---|---|
| DE | 1444321 A | 4/1963 |
| DE | 102005049923 B4 | 12/2017 |
| DE | 102018118026 A1 | 1/2019 |
| EP | 1775265 A2 | 4/2007 |
| WO | 2007090583 A1 | 8/2007 |

OTHER PUBLICATIONS

Search Report, International Application No. PCT/EP2021/076767; Mailed Jan. 4, 2022.
Office Action, CN Patent App. 202180074082.2, Apr. 22, 2025.
Examination Report, Indian Patent App. 202337027329, Nov. 18, 2025.
Examination Report, Chinese Patent App. 202180074082.2, Sep. 4, 2025.
Examination Report, Chinese Patent App. 202180074082.2, Nov. 25, 2025.

* cited by examiner

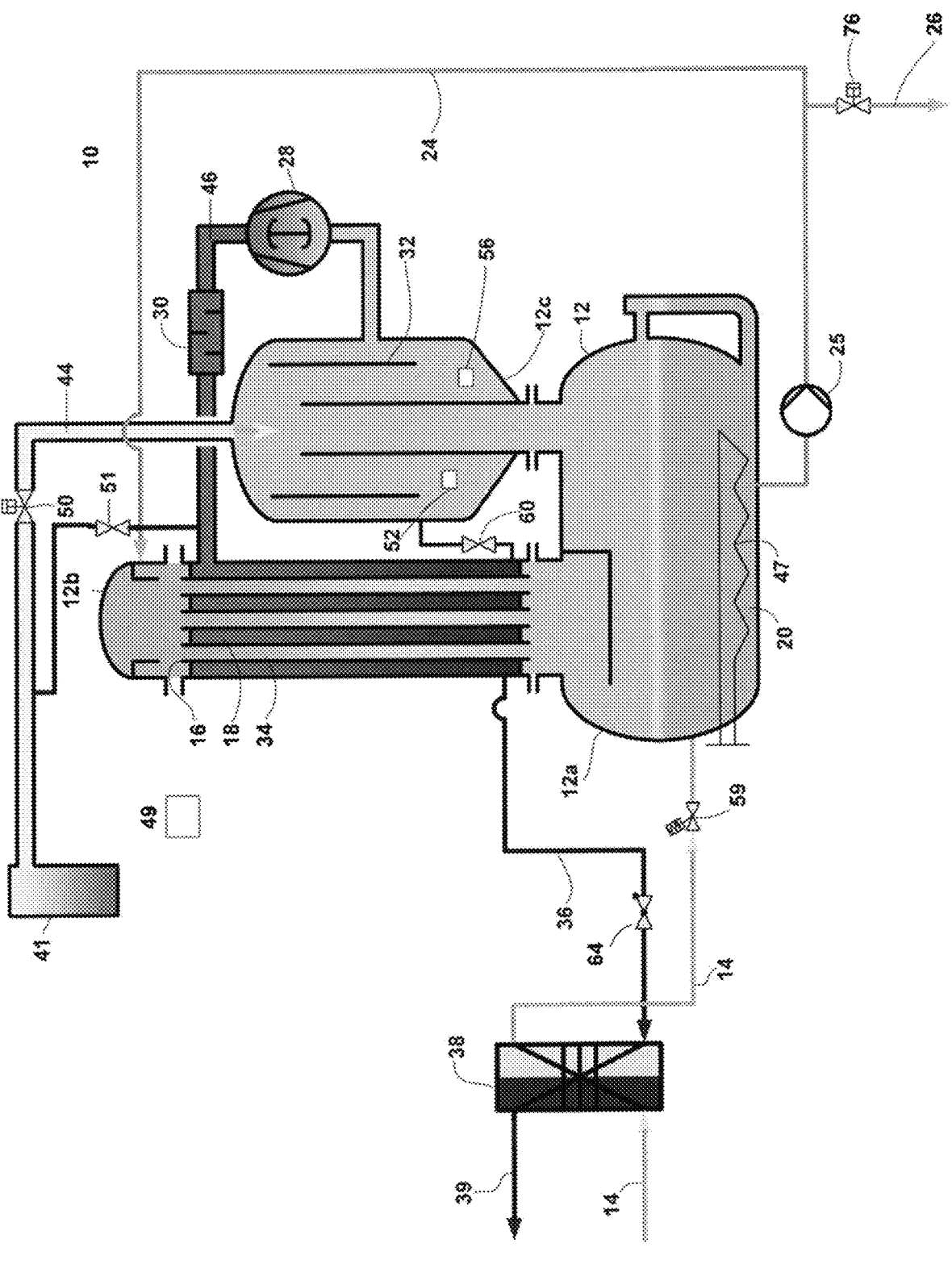

PROCESS WATER DISTILLATION PLANT AND METHOD FOR OPERATING A PROCESS WATER DISTILLATION PLANT

CROSS-REFERENCES TO RELATED APPLICATIONS

This application is based on international patent application PCT/EP 2021/076767 and claims the benefit of the German patent application No. 10 2020 128 823.9 filed on Nov. 2, 2020, the entire disclosures of which are incorporated herein by way of reference.

FIELD OF THE INVENTION

The invention relates to a process water distillation system and a method of operating a process water distillation system.

BACKGROUND OF THE INVENTION

The treatment of industrial wastewater by vacuum distillation represents an effective and at the same time economical method for the purification of contaminated liquids, which arise, for example, as washing solutions in immersion, spray and ultra-sonic cleaning systems, as process solutions in surface finishing processes, such as electroplating, pickling, anodizing, vibratory grinding, degreasing, phosphating, burnishing, powder coating or painting, or in drilling, cutting, grinding and drawing applications, as well as in die casting. These fluids can be contaminated, for example, by solvents, oils, waxes, hydraulic fluids and/or coolants.

DE 10 2005 049 923 B4 discloses a distillation system for purifying industrially contaminated wastewater/process water. The distillation system comprises a vessel with an evaporator/condenser unit, as well as a vapor compressor, which provides the pressure ratios required for evaporation/condensation in the distillation system. The evaporator unit serves to evaporate contaminated liquid supplied to the vessel, wherein undesirable constituents, such as silicones, siloxanes, glycols, waxes, oils, amines, emulsifiers, surfactants, salts, etc., collect in an evaporator sump in a bottom area of the vessel. Purified water vapor, on the other hand, rises in the vessel and is extracted by means of the vapor compressor above a mist separator and fed to the evaporator/condenser unit. In the condenser of the evaporator/condenser unit, the water vapor condenses to purified distillate, which is finally supplied to a distillate cooler. The distillate cooler also serves as a preheater for the contaminated liquid to be supplied to the vessel or the evaporator of the evaporator/condenser unit, respectively.

SUMMARY OF THE INVENTION

The invention is directed to the problem of providing a process water distillation system that provides effective and efficient purification of waste water. Further, the invention is directed to providing a method of operating such a process water distillation system.

A process water distillation system includes an evaporator, a condenser and a compressor. The compressor is configured to generate a desired pressure in at least a region of the process water distillation system and to convey steam from the evaporator into the condenser during operation of the process water distillation system. The condenser is in thermal contact with the evaporator such that, at least during certain phases of operation of the process water distillation system, thermal energy released during condensation of steam conveyed into the condenser is transferred to a fluid in the evaporator.

For example, the evaporator may be located in a tube bundle receiving region of a distillation vessel of the process water distillation system. The condenser may be defined, for example, by an internal volume of the tubes of the tube bundle. The condensate in the tubes of the tube bundle is then flowed around by the fluid to be evaporated in the evaporator, so that an uninterrupted transfer of thermal energy from the condensate in the condenser to the fluid to be evaporated in the evaporator is possible.

Further, the process water distillation system includes a concentrate collection area configured to receive concentrate produced during operation of the process water distillation system. The concentrate typically contains low-volatility impurities that do not evaporate during the distillation process occurring in the process water distillation system during operation of the process water distillation system, and accordingly collect in the concentrate collection area. For example, the concentrate collection area may be located in a sump of the distillation vessel.

As the distillation process progresses, the composition of the concentrate collecting in the concentrate collection area usually changes such that the concentrate becomes enriched with low-volatility components, such as oil-containing impurities or the like. The resulting increase in the boiling point of the concentrate, has the effect of reducing the temperature difference between the evaporator on the one hand and the condenser on the other hand, and consequently of slowing down the heat transfer and thus the energy recovery between the condenser and the evaporator. As a result, the distillation process slows down increasingly and eventually comes to a standstill.

The process water distillation system is therefore additionally equipped with an energy source configured to supply energy to the process water distillation system. Furthermore, a control device is provided which is configured to control the supply of energy from the energy source to the process water distillation system in dependence on the progress of the distillation process in the process water distillation system. The progress of the distillation process, which the control device uses as a control parameter for controlling the supply of energy from the energy source, can be detected, for example, by determining whether the distillation process is still running or has already come to a standstill and/or by determining the speed of the distillation process.

In the process water distillation system described herein, the use of the additional energy provided by the energy source enables the distillation process to be maintained even when the distillation process in thermodynamic equilibrium without external energy input, as described above, increasingly comes to a standstill due to the boiling point increase of the concentrate and the resulting slowdown of the heat transfer between the condenser and the evaporator. The input of additional energy shifts the thermodynamic equilibrium to allow the distillation process to continue, resulting in increasing concentration or thickening of the concentrate. The process water distillation system therefore enables a particularly effective and at the same time efficient purification of waste water.

In a preferred embodiment of the process water distillation system, the energy source comprises a hot gas source configured to supply a hot gas to the process water distillation system. The hot gas provided by the hot gas source may be used to provide thermal energy that promotes or maintains the heat transfer process between the condenser and the evaporator, so that the compression, superheating and condensation of the water vapor in the condenser enables an optimal and thus particularly efficient use of the energy content of the water vapor for compensating the boiling point increase of the concentrate.

The hot gas source may be configured to supply a hot gas to the evaporator and/or the condenser. The hot gas may either be introduced directly into the evaporator and/or the condenser. Alternatively, however, the hot gas may merely be brought into thermal contact with the evaporator and/or the condenser if mixing of the hot gas with the steam/water in the evaporator and/or the condenser is to be prevented.

In a particularly preferred embodiment of the process water distillation system, the hot gas source comprises an external steam source, i.e. a steam source formed separately from the evaporator of the process water distillation system, which is configured to supply water vapor to the process water distillation system. The water vapor provided by the external steam source, for example an external steam generator, can be integrated particularly easily into the heat transfer process between the condenser and the evaporator, since the water vapor does not introduce any substances into the condenser and/or the evaporator that are not already present there.

The hot gas source may be connected to an evaporator section of a distillation vessel of the process water distillation system. For example, the hot gas source may be directly connected to the distillation vessel of the process water distillation system via a hot gas supply line. Alternatively, however, the hot gas supply line may open into a line through which the process water to be purified is supplied to the evaporator during operation of the process water distillation system.

Additionally or alternatively, the hot gas source may be configured to supply a hot gas to the condenser. Preferably, the hot gas source is then connected to the condenser of the process water distillation system. For example, the hot gas source may be directly connected to the condenser of the process water distillation system via a hot gas supply line. Alternatively, however, the hot gas supply line may open into a line through which the vapor from the evaporator to be condensed is supplied to the condenser during operation of the process water distillation system.

Additionally or alternatively, the process water distillation system may comprise an electrical heating device configured to supply thermal energy to the process water distillation system. In particular, the electrical heating device is configured to supply thermal energy to the evaporator. An electrical heating device can fulfill the dual function of, on the one hand, serving as a start-up heater in a preheating phase during an operating start of the process water distillation system and, on the other hand, supplying additional energy to the overall system during a distillation phase during operation of the process water distillation system, which can be used to compensate for the increase in the boiling point of the concentrate.

Preferably, the hot gas source is configured to supply the process water distillation system with hot gas, in particular water vapor, at a pressure above atmospheric pressure. In particular, the hot gas source may be configured to supply hot gas to the process water distillation system at a pressure of at least 2 bar. Additionally or alternatively, the hot gas source may be configured to supply the process water distillation system with saturated water vapor. The saturated water vapor can condense in the condenser of the process water distillation system, thereby supplying additional energy to the process water distillation system.

Preferably, the process water distillation system further comprises at least one temperature sensor configured to measure a temperature in the process water distillation system and to transmit signals characteristic of the temperature in the process water distillation system to the control device. If desired or necessary, there may also be several temperature sensors, which may in particular be installed in different areas of the process water distillation system. In particular, the process water distillation system may comprise a first temperature sensor configured to sense the temperature in the evaporator. Further, a second temperature sensor may be provided which is configured to sense the temperature in the condenser. For example, the second temperature sensor may be positioned to sense the temperature in an exhaust line connected to the condenser. A temperature difference between the evaporator and the condenser is an indicator of the heat transfer between the condenser and the evaporator, and thus the progress of the distillation process in the process water distillation system. If the temperature difference decreases, a reduced heat transfer and consequently a slowing down of the distillation process can be assumed.

Further, the process water distillation system may comprise at least one pressure sensor configured to measure a pressure in the process water distillation system and to transmit signals characteristic of the pressure in the process water distillation system to the control device. If desired or required, several pressure sensors may be present, which may in particular be installed in different areas of the process water distillation system. In particular, the process water distillation system may comprise a first pressure sensor configured to sense the pressure in the evaporator. Further, a second pressure sensor may be provided which is configured to sense the pressure in the condenser.

Preferably, the control device is configured to control the operation of the process water distillation system in dependence on the signals transmitted by the at least one temperature sensor and/or the at least one pressure sensor. In particular, the control device can use the signals transmitted by the at least one temperature sensor and/or the at least one pressure sensor to draw conclusions about the progress of the distillation process in the process water distillation system and to control the supply of energy from the energy source accordingly.

In a preferred embodiment of the process water distillation system, the control device is configured to control the operation of the process water distillation system at an operating start during a preheating phase in such a way that, in a pressure reduction step, the pressure in the process water distillation system is reduced to a pressure below atmospheric pressure. For this purpose, the compressor is controlled accordingly by the control device. Furthermore, process water to be purified is supplied to the process water distillation system. For conveying the process water into the process water distillation system, a vacuum already existing in the process water distillation system at this time can be used. Alternatively, however, an additional conveying device, for example a diaphragm pump or the like, can be used to convey the process water into the process water distillation system.

Subsequently, the compressor may deliver fluid from the evaporator into the condenser in a closed recirculation circuit, wherein the fluid is heated by the compression in the compressor. Upon flowing through the condenser, the fluid transfers the thermal energy released during condensation to the fluid in the evaporator. This heats up the process water distillation system and in particular the evaporator.

Additionally, under the control of the control device, thermal energy and/or hot gas may be supplied to the process water distillation system from the energy source. The additional energy provided by the energy source can shorten the time required to reach the required operating temperature in the process water distillation system, and thus the preheating phase of the system.

In particular, the control device may be configured to control the operation of the process water distillation system at an operating start during a preheating phase in such a way that thermal energy from the electrical heating device of the energy source is supplied to the evaporator of the process water distillation system. This results in additional thermal energy input to the evaporator so that the required operating temperature for continuous distillation in the process water distillation system can be reached more quickly. Additionally or alternatively, hot gas from the hot gas source of the energy source may be supplied to the condenser of the process water distillation system. This additional heat input also allows the operating temperature for continuous distillation to be reached more quickly. In addition, the supply of the hot gas into the condenser prevents the process water in the evaporator from being diluted in an undesirable manner, especially when water vapor is used as the hot gas.

After completion of the preheating phase, when a respective desired operating temperature for continuous distillation has been reached in the process water distillation system, i.e. in the evaporator and in the condenser, the operation of the process water distillation system can be transferred to a distillation phase. The control device is preferably configured to control the operation of the process water distillation system during the distillation phase in such a way that the recirculation of fluid between the evaporator and the condenser is interrupted. This can be achieved, for example, by closing a bypass valve between the evaporator and the condenser. Furthermore, under the control of the control device, distillate may be discharged from the condenser during the distillation phase.

At the same time, as described above, a concentrate collects in the concentrate collection area of the process water distillation system during the distillation phase, wherein, as distillation progresses and consequently the discharge of distillate from the condenser increases, the concentration of low-volatility impurities in the concentrate increases and, accordingly, the boiling point of the concentrate increases. As a result, the distillation process slows down. In dependence on the progress of the distillation process in the process water distillation system, hot gas from the hot gas source of the energy source is therefore preferably supplied to the evaporator and/or the condenser of the process water distillation system under the control of the control device in order to compensate for the boiling point increase of the concentrate and to maintain the distillation process by the additional input of energy into the system.

In particular, the control device may be configured to control the operation of the process water distillation system during the distillation phase in such a way that hot gas from the hot gas source of the energy source is supplied to the evaporator of the process water distillation system when the pressure in the evaporator falls below a pressure threshold value and/or the temperature in the evaporator falls below a temperature threshold value. By supplying hot gas and in particular steam, the pressure and/or temperature in the evaporator can be increased and thus the distillation process can be maintained. The supply of hot gas from the hot gas source of the energy source into the evaporator of the process water distillation system is preferably interrupted under the control of the control device when the temperature in the evaporator exceeds a permissible maximum value.

During this phase of operation of the process water distillation system, the compressor is preferably operated continuously at a constant speed so that the pressure in the evaporator is controlled substantially by the supply of hot gas from the hot gas source of the energy source into the evaporator. The temperature threshold value in the evaporator above which the supply of hot gas from the hot gas source of the energy source into the evaporator is initiated under the control of the control device may, for example, be a temperature corresponding to the temperature of the process water in the process water distillation system.

Further, the control device may be configured to control the operation of the process water distillation system during the distillation phase in such a way that hot gas from the energy source hot gas source is supplied to the condenser of the process water distillation system when the temperature in the condenser falls below a temperature threshold value. By supplying hot gas, the temperature in the condenser can be increased, thereby providing the heat transfer from the fluid flowing through the condenser to the fluid in the evaporator which is necessary to maintain the distillation process in the process water distillation system. The supply of hot gas from the hot gas source of the energy source into the condenser of the process water distillation system is preferably interrupted under the control of the control device when the temperature in the condenser exceeds a permissible maximum value. The permissible maximum value may, for example, be a temperature value above which complete condensation no longer takes place in the condenser.

Furthermore, the control system may be configured to control the operation of the process water distillation system during the distillation phase in such a way that the recirculation of fluid between the evaporator and the condenser is interrupted, distillate is discharged from the condenser and, meanwhile, thermal energy is supplied from the electrical heating device of the energy source into the evaporator of the process water distillation system. This continuous input of additional thermal energy into the evaporator promotes the evaporation process in the evaporator.

Finally, the control device is preferably configured to control the operation of the process water distillation system during a compensation phase, during which the boiling point increase of the concentrate has to be compensated in order to maintain the distillation process, in such a way that a pressure difference between the evaporator and the condenser is increased by means of the compressor until the pressure difference reaches a permissible maximum value. The compensation phase preferably starts when the distillation process can no longer be maintained despite the additional energy input from the energy source. The compensation phase ends when no further advancement of the distillation process is possible with the reaching of the permissible maximum value for the pressure difference.

Furthermore, a method of operating a process water distillation system is described, which comprises an evaporator, a condenser and a compressor configured to generate a desired pressure in at least a region of the process water distillation system during operation of the process water distillation system and to convey steam from the evaporator to the condenser. The condenser is in thermal contact with the evaporator so that, at least during certain phases of operation of the process water distillation system, thermal energy released during condensation of steam conveyed into the condenser is transferred to a fluid in the evaporator. The process water distillation system further comprises a concentrate collection area configured to receive concentrate produced during operation of the process water distillation system, and an energy source configured to supply energy to the process water distillation system. A control device controls the supply of energy from the energy source to the process water distillation system in dependence on the progress of the distillation process.

The energy source may comprise a hot gas source configured to supply a hot gas to the process water distillation system, in particular to the evaporator and/or the condenser. Preferably, the hot gas source comprises an external steam source, such as an external steam generator, which is configured to supply water vapor to the process water distillation system. Additionally or alternatively, the energy source may comprise an electrical heating device configured to supply thermal energy to the process water distillation system, in particular to the evaporator.

The hot gas source is preferably configured to supply hot gas, in particular water vapor, at a pressure above atmospheric pressure, in particular at a pressure of at least 2 bar, and/or saturated water vapor to the process water distillation system.

The process water distillation system preferably further comprises at least one temperature sensor configured to transmit signals characteristic of a temperature in the process water distillation system to the control device. Additionally or alternatively, the process water distillation system may comprise at least one pressure sensor configured to transmit signals characteristic of a pressure in the process water distillation system to the control device. The control device preferably controls the operation of the process water distillation system in dependence on the signals transmitted by the at least one temperature sensor and/or the at least one pressure sensor.

At an operating start during a preheating phase, the control device may control the operation of the process water distillation system in such a way that, in a pressure reduction step, the pressure in the process water distillation system is reduced to a pressure below atmospheric pressure, process water to be purified is supplied to the process water distillation system, the compressor conveys fluid from the evaporator to the condenser in a closed recirculation circuit, wherein the fluid is heated by the compression in the compressor and releases thermal energy to the fluid in the evaporator as it flows through the condenser, and thermal energy and/or hot gas from the energy source is supplied to the process water distillation system.

Additionally or alternatively, at an operating start during a preheating phase, the control device may control the operation of the process water distillation system in such a way that thermal energy from an electrical heating device of the energy source is supplied to the evaporator of the process water distillation system, and/or hot gas from the hot gas source of the energy source is supplied to the condenser of the process water distillation system.

During a distillation phase, the control device may control the operation of the process water distillation system in such a way that the recirculation of fluid between the evaporator and the condenser is interrupted, distillate is discharged from the condenser, and hot gas from the hot gas source of the energy source is supplied to the evaporator and/or condenser of the process water distillation system in dependence on the progress of the distillation process in the process water distillation system.

Additionally or alternatively, during a distillation phase, the control device may control the operation of the process water distillation system in such a way that hot gas from the hot gas source of the energy source is supplied to the evaporator of the process water distillation system when the pressure in the evaporator falls below a pressure threshold value and/or the temperature in the evaporator falls below a temperature threshold value. Under the control of the control device, the supply of hot gas from the hot gas source of the energy source to the evaporator of the process water distillation system may be interrupted when the temperature in the evaporator exceeds a permissible maximum value.

Further, during a distillation phase, the control device may control the operation of the process water distillation system in such a way that water vapor from the external steam generator of the energy source is supplied to the condenser of the process water distillation system when the temperature in the condenser falls below a threshold value. Under the control of the control device, the supply of hot gas from hot gas source of the energy source into the condenser of the process water distillation system may be interrupted when the temperature in the condenser exceeds a permissible maximum value.

Furthermore, during a distillation phase, the control device may control the operation of the process water distillation system in such a way that the recirculation of fluid between the evaporator and the condenser is interrupted, distillate is discharged from the condenser, and thermal energy from an electrical heating device of the energy source is supplied to the evaporator of the process water distillation system.

During a compensation phase, the control device may control the operation of the process water distillation system in such a way that a pressure difference between the evaporator and the condenser is increased by means of the compressor until the pressure difference reaches a permissible maximum value.

Preferred embodiments of the invention are explained in more detail below with reference to the attached schematic drawing, where

BRIEF DESCRIPTION OF THE DRAWINGS

FIG. 1 shows a process water distillation system.

DETAILED DESCRIPTION OF PREFERRED EMBODIMENTS

A process water distillation system 10 shown in FIG. 1 comprises a distillation vessel 12 having a first vessel section 12a, a second vessel section 12b, and a third vessel section 12c. Process water to be purified, which may contain impurities such as silicones, siloxanes, glycols, emulsifiers, surfactants, salts, and light liquids such as gasoline, benzene, lubricants, or oils, is supplied to the first vessel section 12a of the distillation vessel 12 via a process water supply line 14.

A tube bundle 16 is disposed in the second vessel section 12b. In an evaporator 18 provided in an area of the second vessel section receiving the tube bundle 16, the process water is heated and thereby evaporated, wherein low-volatility impurities collect in a concentrate collection area 20 of the first vessel section 12a. The concentrate collection area 20 is disposed in a sump of the first vessel section 12a. During operation of the process water distillation system 10, the concentrate collecting area 20 of the first vessel section 12a mixes with the process water supplied to the first vessel section 12*a* via the process water supply line 14 so that concentrated process water can be conveyed from the first vessel section 12*a* to the evaporator 18 via a feed line 24. After completion of the distillation process, concentrate can be discharged from the concentrate collection area 20 of the first vessel section 12*a* via a concentrate discharge line 26 from the distillation vessel 12 by means of a first conveying device 25.

In the process water distillation system 10 shown herein, evaporation takes place at a reduced pressure compared to atmospheric pressure, wherein a compressor 28 designed here as a vapor compressor ensures that the desired pressure conditions are set in the process water distillation system 10. Downstream of the compressor 28, a pulsation damper 30 is provided. Water vapor formed in the evaporator 18 fills a portion of the first vessel section 12*a* and the third vessel section 12*c* during operation of the process water distillation system 10. The water vapor is passed through a mist eliminator 32 provided in the third vessel section 12*c* and is conveyed to a condenser 34 by means of the compressor 28.

The condenser 34 is defined by an internal volume of the tubes of the tube bundle 16, around which the fluid to be evaporated in the evaporator flows during operation of the process water distillation system 10. The condenser 34 is thus in thermal contact with the evaporator 18 so that, at least during certain phases of operation of the process water distillation system 10, thermal energy released during condensation of vapor delivered to the condenser 34 can be transferred to the fluid in the evaporator 18.

The distillate cooled in the condenser 34 and condensed in the process is eventually passed through a connecting conduit 36 into a heat exchanger 38, and is further cooled as it passes through the heat exchanger 38. In the heat exchanger 38, the distillate is brought into thermal contact with process water to be supplied to the distillation vessel 12 of the process water distillation system 10. Consequently, in the process water distillation system 10, the heat exchanger 38 is used as a process water preheater/distillate cooler. After flowing through the heat exchanger 38, the distillate is discharged from the process water distillation system 10 via a distillate discharge line 39.

Further, the process water distillation system 10 comprises an energy source configured to supply energy to the process water distillation system 10. In the embodiment of the process water distillation system 10 shown herein, the energy source comprises a hot gas source 41 configured in the form of an external steam source or an external steam generator which is configured to supply a hot gas, i.e., water vapor, to the process water distillation system 10. The hot gas source 41 is configured to supply the process water distillation system 10 with hot gas, i.e. water vapor, having a pressure above atmospheric pressure of at least 2 bar and/or saturated water vapor.

The hot gas source 41 is connected to the evaporator 18 via a first hot gas supply line 44 and to the condenser 34 via a second hot gas supply line 45. In particular, the first hot gas supply line 44 opens into an upper region of the third vessel section 12*c*, which is filled with water vapor during operation of the process water distillation system 10. Alternatively, however, the first hot gas supply line 44 may open into a line through which the process water to be purified is supplied to the evaporator 18 during operation of the process water distillation system 10. For example, it is also conceivable to connect the first hot gas supply line 44, upstream of the evaporator 18, to the feed line 24.

The second hot gas supply line 45 opens, downstream of the compressor 28 and downstream of the pulsation damper 30, into a steam discharge line 46 connecting the evaporator 18 to the condenser 34. Alternatively, the second hot gas supply line 45 may also be connected directly to the condenser 34 and open, for example, into one of the tubes of the tube bundle 16.

Further, the energy source comprises an electrical heating device 47 configured to supply thermal energy to the process water distillation system 10. In the embodiment of the process water distillation system 10 shown herein, the electrical heating device 47 is disposed in the concentrate collection area 20, i.e., in the sump of the first vessel section 12*a*, and is thereby configured to supply thermal energy to the evaporator 18.

The operation of the process water distillation system 10 is controlled by means of a control device 49. Among other things, the control device 49 is configured to control the supply of energy to the process water distillation system 10 from the energy source comprising here the hot gas source 41 and the electrical heating device 47. For this purpose, the control device 49 controls the hot gas source 41, a first hot gas supply valve 50 arranged in the first hot gas supply line 44, and a second hot gas supply valve 51 arranged in the second hot gas supply line 45, accordingly, in order, on the one hand, to permit or interrupt the hot gas generation in the hot gas source 41 and, on the other hand, to permit or interrupt the conduction of the generated hot gas from the hot gas source 41 either into the evaporator 18 or the condenser 34, as required.

The process water distillation system 10 further comprises at least one temperature sensor 52, 54 configured to measure a temperature in the process water distillation system 10 and to transmit signals characteristic of the temperature in the process water distillation system 10 to the control device 49. In particular, the process water distillation system 10 comprises a first temperature sensor 54 which serves to sense the temperature in the evaporator 18. A second temperature sensor 54 serves to sense the temperature in the condenser 34. Here, the second temperature sensor 54 is positioned in an exhaust line 55 connected to the condenser 34.

Further, the process water distillation system 10 comprises at least one pressure sensor 56, 58 configured to measure a pressure in the process water distillation system 10 and to transmit signals characteristic of the pressure in the process water distillation system to the control device 49. In particular, the process water distillation system 10 includes a first pressure sensor 56 which serves to sense the pressure in the evaporator 18 and a second pressure sensor 58 which serves to sense the pressure in the condenser 34. The control device 49 controls the operation of the process water distillation system 10 in dependence on the signals transmitted by the sensors 52, 54, 56, 58. In particular, the control device 49 determines the progress of the distillation process in the process water distillation system 10 based on the signals transmitted by the sensors 52, 54, 56, 58 and accordingly controls the supply of energy from the energy source, i.e., the operation of the hot gas source 41 and the operation of the electrical heating device 47.

At an operating start of the process water distillation system 10 during a preheating phase, the control device 49 controls the operation of the process water distillation system 10 in such a way that first, in a pressure reduction step, the pressure in the process water distillation system 10 is reduced to a pressure below atmospheric pressure by corresponding control of the compressor 28. Further, process water to be purified is supplied to the process water distillation system 10 by opening, under the control of the control device 49, a process water supply valve 59 arranged in the process water supply line 14 and using the negative pressure built up in the process water distillation system 10 to supply the process water to the process water distillation system 10.

During the preheating phase, a bypass valve 60 disposed in a bypass line 62 connecting the evaporator 18 to the condenser 34 is open. The compressor 28 thereby conveys fluid from the evaporator 18 to the condenser 34 in a closed recirculation circuit. The fluid heated by compression in the compressor 28 condenses as it flows through the condenser 34. The thermal energy released during condensation is transferred to the fluid to be evaporated in the evaporator 18. This heats up the process water distillation system 10 and in particular the evaporator 18.

The preheating process is assisted by the energy source supplying thermal energy and/or hot gas to the process water distillation system 10 during the preheating phase under the control of the control device 49. In particular, during the preheating phase, under the control of the control device 49, the electrical heating device 47 is operated so that the electrical heating device 47 releases thermal energy to the evaporator 18. Thus, during the preheating phase, the electrical heating device 47 acts as a start-up heater. Furthermore, under the control of the control device 49, the hot gas source 41 is brought into operation and the supply of hot gas to the condenser 34 of the process water distillation system 10 is initiated by opening the second hot gas supply valve 51. By supplying additional energy to the process water distillation system 10, the operating temperature required for continuous distillation in the process water distillation system is reached more quickly, thereby shortening the start-up process.

After completion of the preheating phase, i.e. when a respective desired operating temperature for continuous distillation is reached in the process water distillation system 10, the operation of the process water distillation system 10 is transferred to a distillation phase. For this purpose, under the control of the control device 49, the bypass valve 60 is first closed so that the recirculation of fluid between the evaporator 18 and the condenser 34 is interrupted. Further, under the control of the control device 49, a distillate discharge valve 64 disposed in the connecting line 36 is opened so that distillate is discharged from the condenser 34.

During the distillation phase, a concentrate collects in the concentrate collection area 20, and as distillation progresses and distillate is consequently discharged from the condenser 34, the concentration of low-volatility impurities in the concentrate increases and, accordingly, the boiling point of the concentrate increases. As a result, the distillation process slows down. Therefore, in dependence on the progress of the distillation process in the process water distillation system 10 monitored by means of the sensors 52, 54, 56, 58, hot gas is supplied from the hot gas source 41 to the evaporator 18 and/or the condenser 34 of the process water distillation system under the control of the control device 49. Furthermore, under the control of the control device 49, the electrical heating device 47 remains in operation so that additional thermal energy is introduced into the evaporator 18 from the electrical heating device 47. The additional input of energy into the system can compensate for the boiling point increase of the concentrate, at least for a certain period of time, and maintain the distillation process.

As described above, during the preheating phase, hot gas from the hot gas source 41 is not supplied to the evaporator 18, but only to the condenser 34, in order to prevent the process water to be evaporated from being diluted by the hot gas supplied by the hot gas source 41, i.e., the water vapor generated by the steam generator. During the distillation phase, on the other hand, the hot gas generated by the hot gas source 41 can be supplied to either the evaporator 18 or the condenser 34. In order to supply the hot gas generated by the hot gas source 41 to the evaporator 18, under the control of the control device 49, the first hot gas supply valve 50 arranged in the first hot gas supply line 44 is opened, while the second hot gas supply valve 51 arranged in the second hot gas supply line 45 is closed. The supply of steam from the hot gas source 41 to the condenser 34, on the other hand, takes place as described above by opening the second hot gas supply valve 51 while the first hot gas supply valve 50 is closed.

The supply of hot gas from the hot gas source 41 to the evaporator 18 is initiated during the distillation phase under the control of the control device 49 when the pressure in the evaporator 18 falls below a pressure threshold value and/or the temperature in the evaporator 18 falls below a temperature threshold value. The temperature threshold value in the evaporator 18, below which the supply of hot gas from the hot gas source 41 to the evaporator 18 is initiated, may be, for example, a temperature corresponding to the temperature of the process water in the process water distillation system 10. During the distillation phases, the compressor 48 is operated continuously at a constant speed such that the pressure in the evaporator 18 is controlled substantially by the supply of hot gas from the hot gas source 41 to the evaporator 18. By supplying hot gas, particularly steam, the pressure and the temperature in the evaporator 18 can be increased and thus the distillation process can be maintained for a longer time, even though the boiling point of the concentrate in the concentrate collection area 20 increases. The supply of hot gas from the hot gas source 41 to the evaporator 18 is interrupted when the temperature in the evaporator 18 exceeds a permissible maximum value.

The supply of hot gas from the hot gas source 41 to the condenser 34 is initiated during the distillation phase under the control of the control device 49 when the temperature in the condenser 34 falls below a temperature threshold value. By supplying hot gas, in particular steam, the temperature in the condenser 34 can be increased and thus the heat transfer from the fluid flowing through the condenser 34 to the fluid in the evaporator, which is necessary for maintaining the distillation process in the process water distillation system, can be ensured. The supply of hot gas from the hot gas source 41 to the condenser 34 of the process water distillation system, on the other hand, is interrupted under the control of the control device 49 when the temperature in the condenser 34 exceeds a permissible maximum value, the permissible maximum value being selected as a temperature value above which complete condensation no longer takes place in the condenser 34.

In operation of the process water distillation system 10, the distillation phase is followed by a compensation phase, which begins when the distillation process can no longer be maintained despite the additional energy input from the energy source. During the compensation phase, during which the boiling point increase of the concentrate must be compensated for in order to maintain the distillation process, the control device 49 controls the operation of the process water distillation system 10 and, in particular, the operation of the compressor 28 in such a way that a pressure difference between the evaporator 18 and the condenser 34 is increased by means of the compressor until the pressure difference reaches a permissible maximum value. The permissible maximum value for the pressure difference between the evaporator 18 and the condenser 34 results, for example, from the design of the process water distillation system 10.

The compensation phase and thus the distillation process as a whole end when, with the permissible maximum value for the pressure difference being reached, no further promotion of the distillation process is possible.

The invention claimed is:

1. A process water distillation system comprising:
an evaporator,
a condenser,
a compressor configured to generate a desired pressure in at least a region of the process water distillation system and to convey steam from the evaporator into the condenser during operation of the process water distillation system, the condenser being in thermal contact with the evaporator so that, at least during certain phases of operation of the process water distillation system, thermal energy released during condensation of steam conveyed into the condenser is transferred to a fluid in the evaporator,
a concentrate collection area configured to receive concentrate produced during operation of the process water distillation system,
an energy source configured to supply energy to the process water distillation system, the energy source comprising a hot gas source configured to supply a hot gas to the process water distillation system, and
a control device configured to control the supply of energy from the energy source to the process water distillation system in dependence on the progress of the distillation process in the process water distillation system,
wherein the control device is configured to control the operation of the process water distillation system during a distillation phase in such a way that
hot gas from the hot gas source of the energy source is supplied to the evaporator of the process water distillation system when the pressure in the evaporator falls below a pressure threshold value and/or the temperature in the evaporator falls below a temperature threshold value, and
wherein the control device is configured to control the operation of the process water distillation system during the distillation phase in such a way that
hot gas from the hot gas source of the energy source is supplied to the condenser of the process water distillation system when the temperature in the condenser falls below a temperature threshold value.

2. The process water distillation system according to claim 1, wherein:
the energy source comprises an electrical heating device configured to supply thermal energy to the process water distillation system.

3. The process water distillation system according to claim 1, wherein the hot gas source is configured to supply the process water distillation system with hot gas, at a pressure above atmospheric pressure, and/or saturated water vapor.

4. The process water distillation system according to claim 3, wherein the hot gas source is configured to supply the process water distillation system with water vapor, at a pressure of at least 2 bar.

5. The process water distillation system according to claim 1, further comprising:
at least one temperature sensor configured to transmit signals characteristic of a temperature in the process water distillation system to the control device, and/or
at least one pressure sensor configured to transmit signals characteristic of a pressure in the process water distillation system to the control device,
wherein the control device is configured to control the operation of the process water distillation system in dependence on the signals transmitted by the at least one temperature sensor and/or the at least one pressure sensor.

6. The process water distillation system according to claim 1, wherein the control device is configured to control the operation of the process water distillation system at an operating start during a preheating phase in such a way that
in a pressure reduction step, the pressure in the process water distillation system is reduced to a pressure below atmospheric pressure,
process water to be purified is supplied to the process water distillation system,
the compressor conveys fluid from the evaporator into the condenser in a closed recirculation circuit, wherein the fluid is heated by the compression in the compressor and releases thermal energy to the fluid in the evaporator as it flows through the condenser, and
thermal energy and/or hot gas from the energy source is supplied to the process water distillation system.

7. The process water distillation system according to claim 6, wherein the control device is configured to control the operation of the process water distillation system at an operating start during a preheating phase in such a way that
thermal energy from the electrical heating device of the energy source is supplied to the evaporator of the process water distillation system, and/or
hot gas from a hot gas source of the energy source is supplied to the condenser of the process water distillation system.

8. The process water distillation system according to claim 1, wherein the control device is configured to control the operation of the process water distillation system during a distillation phase in such a way that
the recirculation of fluid between the evaporator and the condenser is interrupted,
distillate is discharged from the condenser, and
hot gas from a hot gas source of the energy source is supplied to the evaporator and/or the condenser of the process water distillation system in dependence on the progress of the distillation process in the process water distillation system.

9. The process water distillation system according to claim 8, wherein the control device is configured to control the operation of the process water distillation system during a distillation phase in such a way that
the supply of hot gas from the hot gas source of the energy source into the evaporator of the process water distillation system is interrupted when the temperature in the evaporator exceeds a permissible maximum value.

10. The process water distillation system according to claim 8, wherein the control device is configured to control the operation of the process water distillation system during a distillation phase in such a way that
the supply of hot gas from the hot gas source of the energy source into the condenser of the process water distillation system is interrupted when the temperature in the condenser exceeds a permissible maximum value.

11. The process water distillation system according to claim 1, wherein the control device is configured to control the operation of the process water distillation system during a distillation phase in such a way that
the recirculation of fluid between the evaporator and the condenser is interrupted,
distillate is discharged from the condenser, and
thermal energy from an electric heating device of the energy source is supplied to the evaporator of the process water distillation system.

12. The process water distillation system according to claim 1, wherein the control device is configured to control the operation of the process water distillation system during a compensation phase in such a way that a pressure difference between the evaporator and the condenser is increased by means of the compressor until the pressure difference reaches a permissible maximum value.

13. The process water distillation system according to claim 1, wherein:

the hot gas source is configured to supply the hot gas to the evaporator and/or the condenser, wherein the hot gas source comprises an external steam source configured to supply water vapor to the process water distillation system.

14. A method of operating a process water distillation system comprising:

an evaporator, a condenser, a compressor configured to generate a desired pressure in at least a region of the process water distillation system and to convey steam from the evaporator into the condenser during operation of the process water distillation system, the condenser being in thermal contact with the evaporator so that, at least during certain phases of operation of the process water distillation system, thermal energy released during condensation of steam conveyed into the condenser is transferred to a fluid in the evaporator, a concentrate collection area configured to receive concentrate produced during operation of the process water distillation system, and an energy source configured to supply energy to the process water distillation system, the energy source comprising a hot gas source configured to supply a hot gas to the process water distillation system, wherein a control device controls the supply of energy from the energy source to the process water distillation system in dependence on the progress of the distillation process in the process water distillation system, wherein the control device controls the operation of the process water distillation system during the distillation phase in such a way that hot gas from the hot gas source of the energy source is supplied to the evaporator of the process water distillation system when the pressure in the evaporator falls below a pressure threshold value and/or the temperature in the evaporator falls below a temperature threshold value, and the control device controls the operation of the process water distillation system during a distillation phase in such a way that hot gas from the hot gas source of the energy source is supplied to the condenser of the process water distillation system when the temperature in the condenser falls below a temperature threshold value.

15. The method according to claim 14, wherein:

the energy source comprises an electrical heating device configured to supply thermal energy to the process water distillation system.

16. The method according to claim 14, wherein the hot gas source is configured to supply the process water distillation system with hot gas, at a pressure above atmospheric pressure, and/or saturated water vapor.

17. The method according to claim 14, wherein the process water distillation system further comprises:

at least one temperature sensor configured to transmit signals characteristic of a temperature in the process water distillation system to the control device, and/or at least one pressure sensor configured to transmit signals characteristic of a pressure in the process water distillation system to the control device, wherein the control device controls the operation of the process water distillation system in dependence on the signals transmitted by the at least one temperature sensor and/or the at least one pressure sensor.

18. The method according to claim 14, wherein:

the control device controls the operation of the process water distillation system at an operating start during a preheating phase in such a way that in a pressure reduction step, the pressure in the process water distillation system is reduced to a pressure below atmospheric pressure, process water to be purified is supplied to the process water distillation system, the compressor conveys fluid from the evaporator into the condenser in a closed recirculation circuit, wherein the fluid is heated by the compression in the compressor and releases thermal energy to the fluid in the evaporator as it flows through the condenser, and thermal energy and/or hot gas from the energy source is supplied to the process water distillation system, and/or the control device controls the operation of the process water distillation system at an operating start during a preheating phase in such a way that thermal energy from the electrical heating device of the energy source is supplied to the evaporator of the process water distillation system, and/or hot gas from a hot gas source of the energy source is supplied to the condenser of the process water distillation system.

19. The method according to claim 14, wherein:

the control device controls the operation of the process water distillation system during a distillation phase in such a way that the recirculation of fluid between the evaporator and the condenser is interrupted, distillate is discharged from the condenser, and hot gas from a hot gas source of the energy source is supplied to the evaporator and/or the condenser of the process water distillation system in dependence on the progress of the distillation process in the process water distillation system, and/or the control device controls the operation of the process water distillation system during a distillation phase in such a way that the supply of hot gas from the hot gas source of the energy source into the evaporator of the process water distillation system is interrupted when the temperature in the evaporator exceeds a permissible maximum value, and/or the control device controls the operation of the process water distillation system during a distillation phase in such a way that the supply of hot gas from the hot gas source of the energy source into the condenser of the process water distillation system is interrupted when the temperature in the condenser exceeds a permissible maximum value, and/or the control device controls the operation of the process water distillation system during a distillation phase in such a way that the recirculation of fluid between the evaporator and the condenser is interrupted, distillate is discharged from the condenser, and thermal energy from an electric heating device of the energy source is supplied to the evaporator of the process water distillation system.

20. The method according to claim 14, wherein:

the control device controls the operation of the process water distillation system during a compensation phase in such a way that a pressure difference between the evaporator and the condenser is increased by means of the compressor until the pressure difference reaches a permissible maximum value.

\* \* \* \* \*